(12) United States Patent
Poirot-Crouvezier (10) Patent No.: US 10,862,150 B2
(45) Date of Patent: Dec. 8, 2020

(54) GROUP OF CELLS FOR POWER ADAPTATION OF ELECTROCHEMICAL REACTORS

(71) Applicant: Commissariat a l'energie atomique et aux energies alternatives, Paris (FR)

(72) Inventor: Jean-Philippe Poirot-Crouvezier, Saint Georges de Commiers (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 150 days.

(21) Appl. No.: 16/243,275

(22) Filed: Jan. 9, 2019

(65) Prior Publication Data
US 2019/0221873 A1    Jul. 18, 2019

(30) Foreign Application Priority Data

Jan. 18, 2018   (FR) ...................................... 18 50414

(51) Int. Cl.
*H01M 8/1004*   (2016.01)
*H01M 8/2465*   (2016.01)
(Continued)

(52) U.S. Cl.
CPC ............. *H01M 8/1004* (2013.01); *C25B 1/10* (2013.01); *C25B 9/08* (2013.01); *C25B 9/18* (2013.01);
(Continued)

(58) Field of Classification Search
None
See application file for complete search history.

(56) References Cited

U.S. PATENT DOCUMENTS

| 8,206,877 B2 * | 6/2012 | Koike | H01M 4/8642 |
| | | | 429/523 |
| 2007/0172720 A1 * | 7/2007 | Mogi | H01M 8/0247 |
| | | | 429/492 |

(Continued)

FOREIGN PATENT DOCUMENTS

| EP | 2 337 127 A1 | 6/2011 |
| JP | 2013-85999 A | 5/2013 |
| WO | WO 2012/130932 A1 | 10/2012 |

OTHER PUBLICATIONS

French Preliminary Search Report and Written Opinion dated Sep. 25, 2018 in Patent Application No. 1850414 (with English language translation of categories of cited documents).

*Primary Examiner* — Rena Dye Cronin
(74) *Attorney, Agent, or Firm* — Oblon, McClelland, Maier & Neustadt, L.L.P.

(57) ABSTRACT

An assembly of electrochemical cells for an electrochemical reactor, including a first electrochemical cell, including a first membrane/electrode assembly including a first anode and a first cathode on either side of a proton exchange membrane; first and second flow guides positioned on either side of the first assembly; a second electrochemical cell, including a second membrane/electrode assembly including a second anode and a second cathode on either side of a proton exchange membrane; third and fourth flow guides on either side of the second membrane/electrode assembly; the first and third flow guides have one and the same geometry; the first anode and the second anode have different distributions of surface densities of electrocatalytic material on respective faces of the first and second proton exchange membranes.

13 Claims, 5 Drawing Sheets

(51) Int. Cl.

| | | |
|---|---|---|
| *H01M 8/0258* | (2016.01) | |
| *C25B 9/18* | (2006.01) | |
| *H01M 4/86* | (2006.01) | |
| *H01M 8/249* | (2016.01) | |
| *H01M 8/241* | (2016.01) | |
| *H01M 8/1018* | (2016.01) | |
| *C25B 15/08* | (2006.01) | |
| *C25B 9/08* | (2006.01) | |
| *C25B 1/10* | (2006.01) | |

(52) U.S. Cl.
CPC .............. *C25B 15/08* (2013.01); *H01M 4/861* (2013.01); *H01M 4/8636* (2013.01); *H01M 8/0258* (2013.01); *H01M 8/241* (2013.01); *H01M 8/249* (2013.01); *H01M 8/2465* (2013.01); *H01M 2008/1095* (2013.01)

(56) References Cited

U.S. PATENT DOCUMENTS

| | | | | |
|---|---|---|---|---|
| 2007/0231661 A1* | 10/2007 | Hayashi | ............... | H01M 8/0247 |
| | | | | 429/510 |
| 2011/0207016 A1* | 8/2011 | Akiyama | ................ | H01M 4/92 |
| | | | | 429/480 |
| 2014/0099565 A1 | 4/2014 | Vincent et al. | | |
| 2017/0271690 A1* | 9/2017 | Vincent | ............... | H01M 8/0258 |
| 2018/0309141 A1* | 10/2018 | Asano | .................... | H01M 8/22 |
| 2019/0181460 A1* | 6/2019 | Poirot-Crouvezier | ........................ | |
| | | | | H01M 8/241 |
| 2019/0181462 A1* | 6/2019 | Poirot-Crouvezier | ........................ | |
| | | | | H01M 8/028 |

* cited by examiner

GROUP OF CELLS FOR POWER ADAPTATION OF ELECTROCHEMICAL REACTORS

The invention relates to proton exchange membrane electrochemical reactors, such as electrolysers for producing dihydrogen by electrolysis of water, or fuel cells for producing electricity.

Proton exchange membrane electrochemical reactors are used at an operating temperature below 300° C. The proton exchange membrane forms a solid electrolyte. For low-temperature applications, membranes of the polybenzimidazole type loaded with phosphoric acid are generally used.

In particular, a fuel cell usually includes a stack of elementary cells in which an electrochemical reaction takes place between two reactants that are introduced continuously. The fuel is brought into contact with the anode, and the combustive is brought into contact with the cathode.

The reaction is divided into two half-reactions, which take place on the one hand at the anode/membrane interface and on the other hand at the cathode/membrane interface. The half-reactions can only take place if there is an ionic conductor between the two electrodes and an electron conductor.

The fluids are brought into contact with the reaction zones from inlet and outlet collectors, which generally pass right through the stack. The fluids are generally guided between a collector and their reaction zone by flow channels of a bipolar plate, also having a function of electric conduction and a function of transmission of a clamping force on the stack of cells. Each collector is surrounded by a seal preventing mixing of the various fluids circulating in the fuel cell.

The dimensioning of an electrochemical reactor generally includes preliminary establishment of the number of cells stacked and of their active surface area, as a function of the intended final application. The operating conditions make it possible to define beforehand the intrinsic performance of the cells during operation. A polarization curve is defined by testing a reference electrochemical cell. From this polarization curve it is possible to find the voltage of the cell as a function of the current density, for given operating conditions. As the stacked electrochemical cells are identical, it is possible to find the operating conditions of the all the cells from this polarization curve.

The choice of the optimum operating point for a given application is generally defined by an objective of energy efficiency, as the cell voltage has a direct influence on the efficiency of the electrochemical reaction: the lower the voltage, the greater the release of heat, to the detriment of the electrical efficiency. A cell voltage and current density are then defined for the optimum operating point.

The number of stacked cells is defined by the ratio of the total voltage for the intended final application to the voltage for the optimum operating point of a unit cell. As the stacked electrochemical cells are identical, the active surface area of a cell is defined by the ratio of the total power for the intended final application to the power density for the optimum operating point. The geometry of the active surface of the membrane/electrode assemblies, and therefore the geometry of their anodes and cathodes, may then be defined.

Once the geometry of the active surface is defined, the bipolar plates are designed and dimensioned. Notably the position of the fluid flow collectors, flow guiding channels and seals is defined.

To design a fuel cell for a specific application, existing designs of membrane/electrode assemblies and of bipolar plates are commonly reused. Dimensioning then essentially involves defining the active surface area necessary for the intended application, and the choice of the number of electrochemical cells to be included in the stack to provide this active surface area.

If we wish to design a new fuel cell having increased power relative to an existing design, it is generally easy to increase the number of electrochemical cells stacked and connected in series, or the number of stacks connected in parallel.

In contrast, when we wish to design a new fuel cell having reduced power relative to an existing design, the operating point of this new fuel cell is commonly modified to reduce the current density produced by each cell, and increase its operating voltage. However, such a change of the operating point alters the use of the fuel cell. In fact, the mass flow of the reactants passing through each cell is lower than that for which it was designed. Evacuation of the water produced in each electrochemical cell may then prove problematic, leading to blocking of reactant flow channels. Moreover, if just one of the electrochemical cells has a different operating point, it is tricky to manage this operating point relative to that of the other electrochemical cells.

To solve this problem, document U.S. Pat. No. 6,911,277 proposes inserting a movable baffle in a reactant collector. By active control of the position of this movable baffle, it is possible to modify the supply of reactants from different flow channels of the active zone as a function of the pressure losses. However, this active control is complex to manage and constitutes an additional failure factor for the fuel cell. The cost of such a fuel cell relative to its power is also degraded for such a solution, despite the reuse of known designs of membrane/electrode assemblies and of bipolar plates. Moreover, the increase in operating voltage of the electrochemical cells promotes degradation phenomena and then reduces their service life.

Document JP2013/085999 describes several electrochemical cells connected in series for treating a gas stream.

Document EP2337127 describes an electrochemical cell. The composition of a cathode is heterogeneous along a flow path.

Document WO2012/130932 describes an electrochemical cell. The composition of a cathode is heterogeneous along a flow path.

The invention aims to solve one or more of these drawbacks. The invention thus relates to an assembly of electrochemical cells for an electrochemical reactor, as defined in the accompanying claims.

The invention also relates to the variants of the dependent claims. A person skilled in the art will understand that each of the features of the variants of the dependent claims and description may be combined independently with the features of an independent claim, but without constituting an intermediate generalization.

The invention also relates to an electrochemical reactor, as defined in the accompanying claims.

The invention further relates to a fuel cell, including a stack of electrochemical cells, said stack including an assembly of electrochemical cells as defined above.

Other features and advantages of the invention will become clearer from the description that is given hereunder, as a guide and not in any way limiting, referring to the appended drawings, in which.

Figure 1:
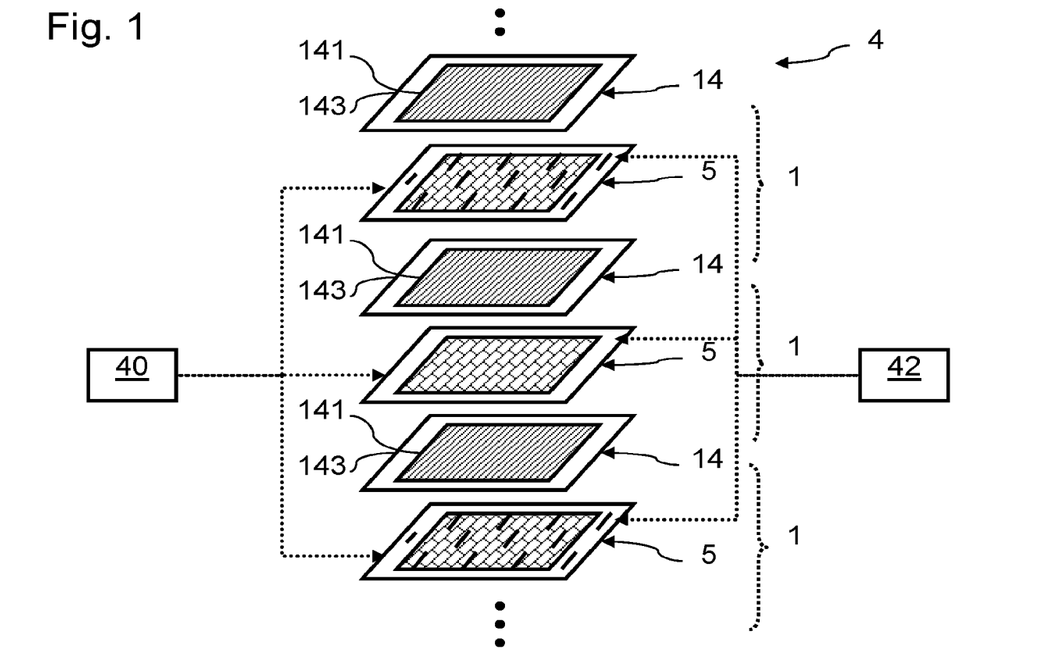
FIG. 1 is an exploded perspective view of an example of a stack of membrane/electrode assemblies and of bipolar plates for a fuel cell.

FIG. 1 is a schematic exploded perspective view of a stack of cells 1 of a fuel cell 4. The fuel cell 4 comprises several superposed cells 1. The cells 1 are of the type with a proton exchange membrane or polymer electrolyte membrane.

The fuel cell 4 comprises a fuel source 40. Here, the fuel source 40 supplies dihydrogen to an inlet of each cell 1. The fuel cell 4 also comprises a source of combustive 42. Here, the source of combustive 42 supplies air to the inlet of each cell 1, the oxygen of the air being used as oxidant. Each cell 1 also comprises exhaust channels. One or more cells 1 also have a cooling circuit of the reactive zone.

Each cell 1 comprises a membrane/electrode assembly 14 or MEA 14. A membrane/electrode assembly 14 comprises a solid electrolyte 143, a cathode (not illustrated) and an anode 141 placed on either side of the electrolyte and fixed on this electrolyte 143. The layer of electrolyte 143 forms a membrane allowing proton conduction while being impermeable to the gases present in the cell. The layer of electrolyte also prevents passage of electrons between the anode 141 and the cathode. The electrolyte 143 is for example configured for being used at an operating temperature above 100° C., typically an operating temperature of 180° C. Said electrolyte 143 may for example be of polybenzimidazole (PBI) doped with phosphoric acid A bipolar plate 5 is arranged between each pair of adjacent MEAs. On each face of an MEA, a bipolar plate 5 forms a reactant flow guide for a reactive zone. Here, each bipolar plate 5 defines anode flow channels and cathode flow channels on opposite external faces. Bipolar plates 5 also define flow channels for liquid coolant between two successive membrane/electrode assemblies. The bipolar plates 5 may each be formed in a manner known per se from two assembled conductive metal sheets, for example of stainless steel, or of titanium alloy, aluminium alloy, nickel alloy or tantalum alloy. Each sheet then defines a respective external face. The bipolar plates 5 may also be obtained by any other method, for example moulding or injection moulding from carbon-polymer composites. The bipolar plates 5 may thus also be formed as an integral part. The external faces of the bipolar plate 5 are then defined by said integral part. Each cell 1 may further comprise a gas diffusion layer (not illustrated) arranged between the anode and a bipolar plate, and another gas diffusion layer arranged between the cathode and another bipolar plate. The membrane/electrode assemblies 14 may comprise reinforcements, not illustrated here.

In a manner known per se, during operation of the fuel cell 4, air flows between an MEA 14 and a bipolar plate 5, and dihydrogen flows between this MEA 14 and another bipolar plate 5. The bipolar plates 5 notably have a function of guiding the flow of the reactants on either side of the MEA 14. At the anode, dihydrogen is ionized to produce protons, which cross the MEA 14. The electrons produced by this reaction are collected by a bipolar plate 5. The electrons produced are then applied to an electrical load connected to the fuel cell 4 to form an electric current. At the cathode, oxygen is reduced and reacts with the protons to form water. The reactions at the anode and cathode are governed as follows:

$$2H_2 \rightarrow 4H^+ + 4e^-\text{ at the anode;}$$

$$4H^+ + 4e^- + O_2 \rightarrow 2H_2O\text{ at the cathode.}$$

While it is operating, a cell 1 of the fuel cell 4 usually generates a DC voltage between the anode and the cathode of the order of 1V.

The source of combustive 42 typically comprises a compressor for introducing air at a given pressure at the inlet of the cells 1. Said compressor receives for example a set value of air pressure, and the air pressure can be regulated by variable rotary speed of the compressor.

The stack of bipolar plates 5 and membrane/electrode assemblies 14 is intended to form a plurality of flow collectors. For this purpose, respective holes are made through the bipolar plates 5 and through the membrane/electrode assemblies 14. The holes in the bipolar plates 5 and membrane/electrode assemblies 14 are arranged opposite one another to form the various flow collectors.

Figure 3:
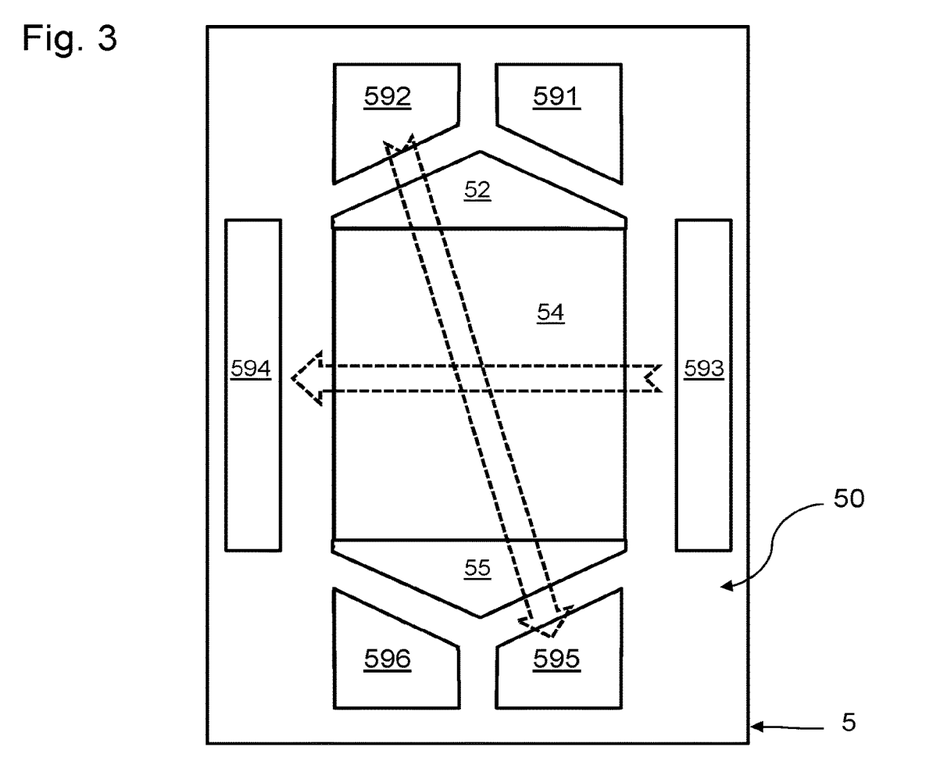
FIG. 3 is a view of a bipolar plate of a fuel cell according to one embodiment of the invention.

FIG. 3 is a schematic top view of a bipolar plate 5 given as an example, for a fuel cell according to one embodiment of the invention. A sheet 50 of the bipolar plate 5 is thus illustrated in top view. Seals, not illustrated, are pressed against an MEA, not illustrated in this figure. The face of the sheet 50 that is illustrated is intended to face the anode of a membrane/electrode assembly.

The bipolar plates 5 thus comprise holes 591 and 592 at one longitudinal first end, and holes 595 and 596 at a longitudinal second end. In a central zone 54, the bipolar plates 5 comprise a hole 593 near holes 591 and 592, and a hole 594 near holes 595 and 596.

Hole 591 serves for example for forming a fuel supply collector, hole 596 serves for example for forming a collector for evacuating combustion residues and unused fuel. Hole 593 serves for example for forming a collector for supply of liquid coolant for the central zone 54, hole 594 serves for example for forming a collector for evacuating this liquid coolant. Hole 592 serves for example for forming a collector for supplying combustive, and hole 595 serves for example for forming a collector for evacuating water produced and unused combustive. The central zone 54 corresponds overall to a reactive zone of the fuel cell. The central zone 54 comprises flow channels. A homogenization zone 52 is advantageously formed between the central zone and holes 591 and 592. A homogenization zone 55 is advantageously formed between the central zone and holes 595 and 596.

In this example, the general direction of reactant flow (identified by the arrow joining holes 592 and 595) is perpendicular to the direction of flow of liquid coolant (defined by an arrow joining holes 593 and 594). The invention also applies of course to fuel cells with different directions of flow of reactants and of cooling fluid.

Figure 2:
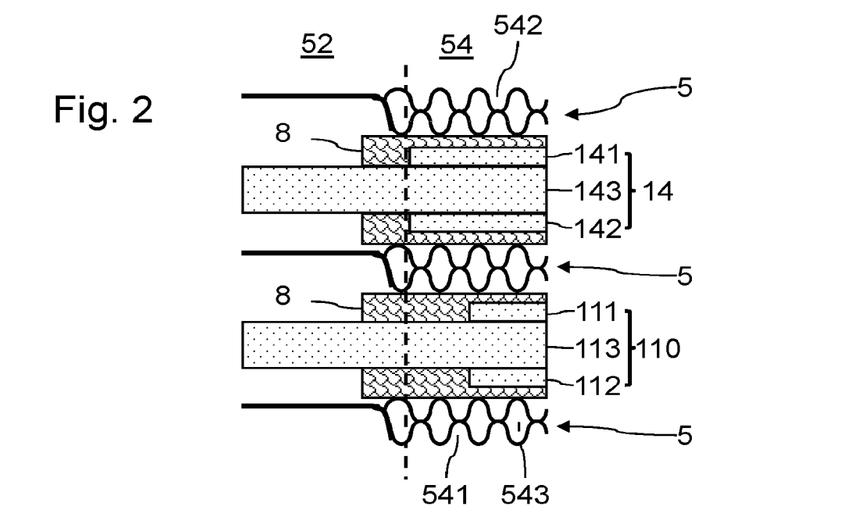
FIG. 2 is a sectional view of a stack for a fuel cell according to one embodiment of the invention.

FIG. 2 is a partial sectional view of a stack of electrochemical cells of a fuel cell 4 according to one embodiment of the invention. In its stack, fuel cell 4 comprises an assembly of electrochemical cells of at least two types.

The fuel cell 4 comprises several electrochemical cells of a first type. These electrochemical cells are intended to supply a nominal unit power for their operating point. Each electrochemical cell of the first type comprises a membrane/electrode assembly 14 having an anode 141, a cathode 142 and a proton exchange membrane 143. The anode 141 and the cathode 142 include, in a manner known per se, respective electrocatalytic materials. Each electrochemical cell of the first type is positioned between two flow guides in the reactive zone, defined here by faces of bipolar plates 5.

The fuel cell 4 further comprises an electrochemical cell of the second type. The second electrochemical cell is intended to supply a lower power than that of the electrochemical cells of the first type. The electrochemical cell of the second type comprises a membrane/electrode assembly 110 having an anode 111, a cathode 112 and a proton exchange membrane 113. The anode 111 and the cathode 112 include, in a manner known per se, respective electrocatalytic materials. The electrochemical cell of the second type is positioned between two flow guides in the reactive zone, defined here by faces of bipolar plates 5.

Each of the bipolar plates 5 comprises flow channels 541 positioned facing an anode, flow channels 542 positioned facing a cathode, and flow channels 543 for cooling fluid.

Holes in the bipolar plates 5 and in the membrane/electrode assemblies 14 and 110 are arranged opposite in order to form the various flow collectors.

So as to be able to reduce the cost of manufacture of the fuel cell 4, the flow guides of the bipolar plates, defining the flow in the reactive zone, have the same geometry and the same composition in the electrochemical cells of the first type and in the electrochemical cells of the second type. The bipolar plates 5 may thus differ in their geometry and in their composition outside of the reactive zone. The bipolar plates 5 advantageously have the same geometry and the same composition in the electrochemical cells of the first type and in the electrochemical cells of the second type. Similarly, in order to reduce the costs of manufacture, the proton exchange membrane 113 has the same geometry and the same composition as the proton exchange membranes 143. Such a configuration also makes it possible to avoid altering the mechanical behaviour of the stack of the fuel cell 4.

The difference in power between the cells of the first type and the cell of the second type allows fine adjustment of the power of the fuel cell 4 to a desired value, not corresponding to a multiple of the nominal power of the electrochemical cells of the first type. The difference in power between the cells of the first type and the cell of the second type is obtained here with an anode 141 (and/or a cathode 142) having a different distribution of surface density of electrocatalytic material from that of the anode 111 (and/or from that of the cathode 112). The anodes 111 and 141 include one and the same electrocatalytic material. The cathodes 112 and 142 use one and the same electrocatalytic material. Such a configuration further makes it possible to reduce the amount of electrocatalytic material used for the anode 111 (and/or for the cathode 112), which makes it possible to reduce the cost of said material, which is generally expensive.

In particular, said difference in distribution of surface density of electrocatalytic material between the anode 111 and the anodes 141 (and/or between the cathode 112 and the cathodes 142) is obtained by forming anodes 141 (and/or cathodes 142) completely covering a central part of their proton exchange membrane 143, whereas the proton exchange membrane 113 has a central part having a zone that is not covered by the anode 111 (and/or by the cathode 112).

In addition, such a configuration makes it possible to use one and the same operating point (cell voltage and current density) for all of the electrochemical cells. Thus, the power of the fuel cell 4 may be dimensioned most correctly without requiring management of a separate operating point for the electrochemical cell including the membrane/electrode assembly 110, and without causing accelerated degradation of this electrochemical cell. Moreover, owing to conservation of the geometry of the bipolar plates 5 and proton exchange membranes 143 and 113, identical flow conditions are obtained through the electrochemical cells of the first type and through the electrochemical cell of the second type.

Figure 4:
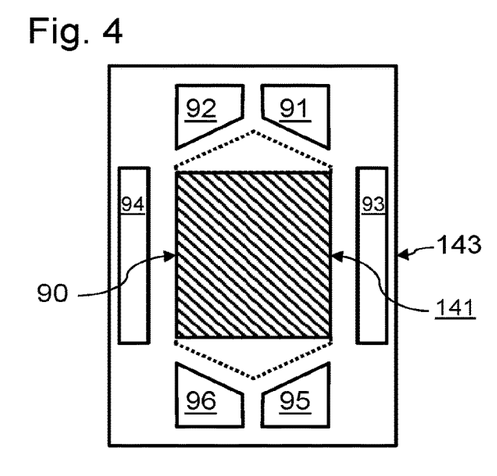
FIGS. 4 to 14 are views of different configurations of membrane/electrode assemblies for carrying out the invention.

FIG. 4 is a schematic top view of an example of membrane/electrode assembly 14 for an electrochemical cell of the first type. A central portion 90 of the proton exchange membrane 143 is covered completely by the anode 141. This central portion 90 is intended to be superposed on the central portion 54 of a bipolar plate 5 as illustrated in FIG. 2. Here, the proton exchange membrane 143 further comprises holes 91 to 96, intended to be superposed respectively with the holes 591 to 596 in the bipolar plates 5. On a face opposite the proton exchange membrane 143, a cathode completely covers the central portion 90. In projection on the proton exchange membrane 143 in a direction normal to the latter, the anode 141 and the cathode 142 advantageously have an identical shape: in fact, as the surface area of electrochemical reaction of a membrane/electrode assembly corresponds to the overlap between the anode and the cathode, it is desirable to optimize this area of reaction by maximizing the overlap between the anode and the cathode.

In this example, the anode 141 and the cathode 142 have a homogeneous composition and thus have homogeneous respective surface densities of electrocatalytic materials. For simplicity, the geometry of the anode 141 is rectangular.

FIGS. 5 to 14 are schematic top views of different examples of membrane/electrode assemblies 113 for an electrochemical cell of the second type. A central portion 90 of the proton exchange membrane 113 is covered partially by the anode 111. A zone 97 of the central portion 90 is not covered by the anode 111. On an opposite face of the proton exchange membrane 113, a cathode partially covers a zone of the central portion 90. The zone 97 of the central portion 90 is not covered by this cathode. In projection on the proton exchange membrane 113 in a direction normal to the latter, the anode 111 and the cathode 112 advantageously have an identical shape. Consequently, in the following examples only the geometry of the anode 111 will be described.

Figure 5:
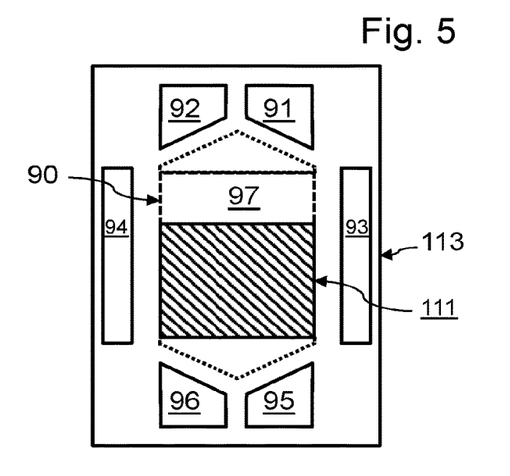
Figure 6:
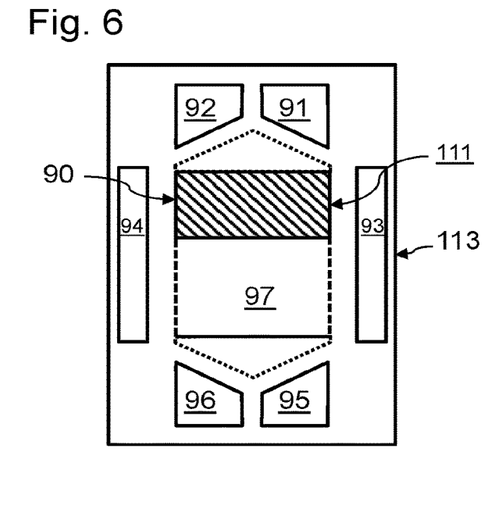
Figure 7:
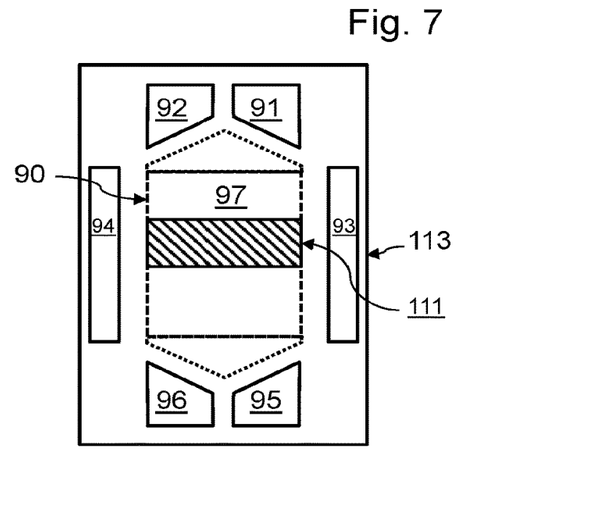

In the examples in FIGS. 5 to 7, the anode 111 is formed as one piece. Here, the anode 111 has a homogeneous composition, with a surface density of electrocatalytic material identical to that of anode 141, on the zone of the membrane 113 that it covers. Such a configuration is in particular favourable for obtaining a uniform contribution of the air introduced for the electrochemical reaction, and complete reaction of the combustive in this air. In fact, it is desirable to consume all of the oxygen of the air introduced, so as not to lose energy needlessly for compressing oxygen that would not react. Such a configuration also makes it possible to homogenize the electrochemical reaction at the anode, to reduce the risk of possible flooding of certain flow zones.

In the example in FIG. 5, the anode 111 is formed near the exhaust ports 95 and 96. The anode 111 is in the form of a rectangular band, in the direction of the width of the reactive zone. The direction of the width will be defined as a direction perpendicular to a line joining holes 591 and 596, and the length as a direction parallel to this line joining holes 591 and 592. Zone 97 is positioned near the inlet holes 91 and 92.

In the example in FIG. 6, the anode 111 is formed near the inlet holes 91 and 92. The anode 111 is in the form of a rectangular band, in the direction of the width of the reactive zone. Zone 97 is positioned near the exhaust ports 95 and 96.

In the example in FIG. 7, the anode 111 is formed on a central part of the proton exchange membrane 113, zone 97 being formed on either side of the anode 111, near the inlet holes 91 and 92 on the one hand and near the exhaust holes or ports 95 and 96 on the other hand. The anode 111 is in the form of a rectangular band, in the direction of the width of the reactive zone.

Figure 8:
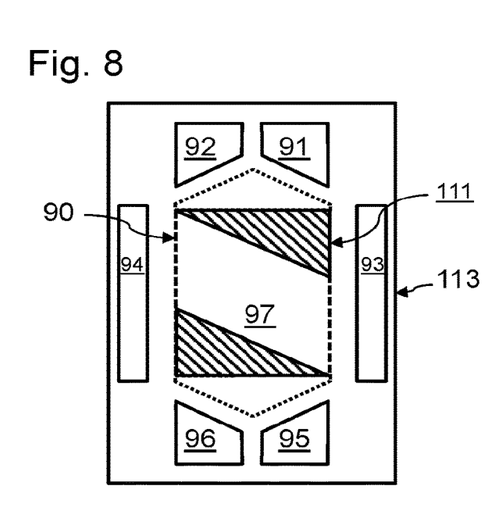
Figure 9:
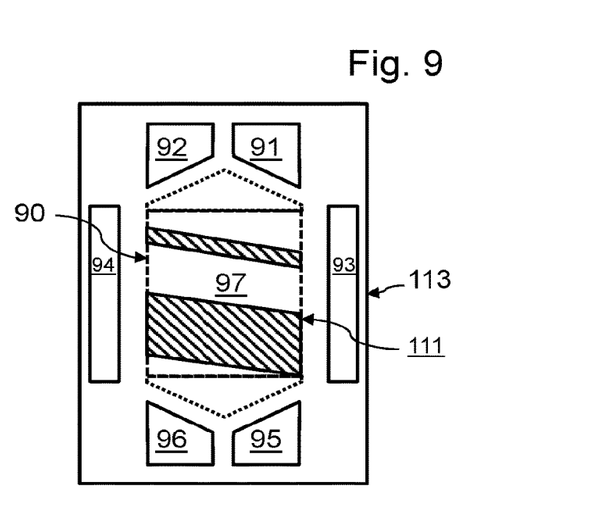
Figure 10:
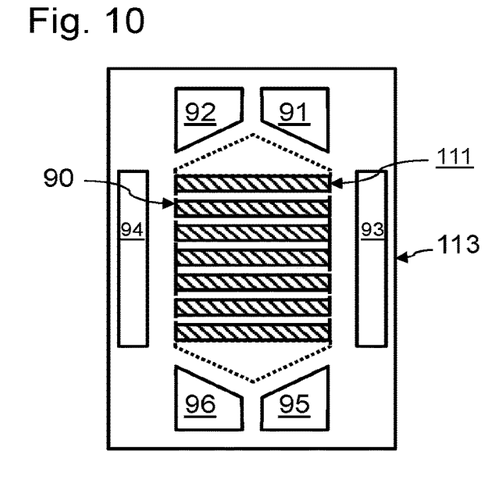

In the examples in FIGS. 8 to 10, the anode 111 is formed of several separate elements. Here, the anode 111 has a homogeneous composition, with a surface density of electrocatalytic material identical to that of anode 141, on the zone of the membrane 113 that it covers. Such a configuration is particularly favourable for avoiding concentration of heat produced or concentration of electric power produced. Such a configuration then makes it possible either to reduce the electrical losses, or to homogenize operation by spreading the thermal gradient of the heat produced by the reaction.

In the example in FIG. 8, the anode 111 comprises an element formed near the exhaust ports 95 and 96 and an element formed near the inlet holes 91 and 92. The elements of the anode 111 are separated by a zone 97. The elements 111 are in the form of triangles extending in the direction of the width of the reactive zone.

In the example in FIG. 9, the anode 111 comprises an element formed near the exhaust ports 95 and 96 and an element formed near the inlet holes 91 and 92. The elements of the anode 111 are separated by a zone 97. Zones 97 of triangular shape are also formed near the exhaust ports 95 and 96 on the one hand, and near the inlet holes 91 and 92 on the other hand. The elements 111 are in the form of trapezia extending in the direction of the width of the reactive zone.

In the example in FIG. 10, the anode 111 is formed by several separate rectangular bands, distributed between the inlet holes 91 and 92 and the exhaust ports 95 and 96. The anode 111 is in the form of rectangular bands, extending in the direction of the width of the reactive zone. The different bands of the anode 111 are separated by zones 97.

In the examples in FIGS. 11 to 14, the anode 111 is formed by inserting multiple zones 97 distributed according to a pattern in the anode 111. The zones 97 may for example be formed of small recesses in the anode 111, for example rectangular or circular. The recesses are advantageously distributed uniformly in the anode 111. The recesses advantageously have the same geometry.

Figure 11:
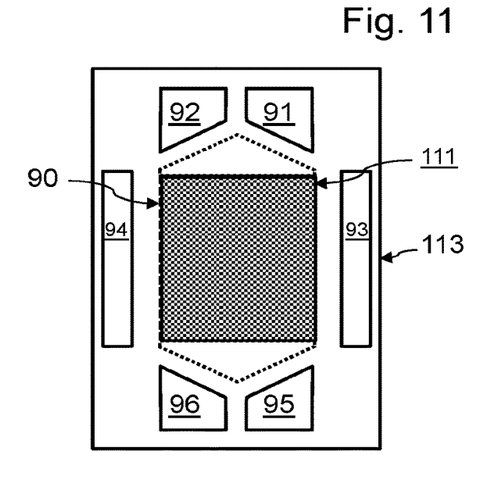

In the example in FIG. 11, the surface density of the recesses is relatively low. Here, the effective surface of the anode 111 represents 80% of the surface of the anode 141. The anode 111 extends from near the inlet holes 91 and 92 to near the exhaust ports 95 and 96.

Figure 12:
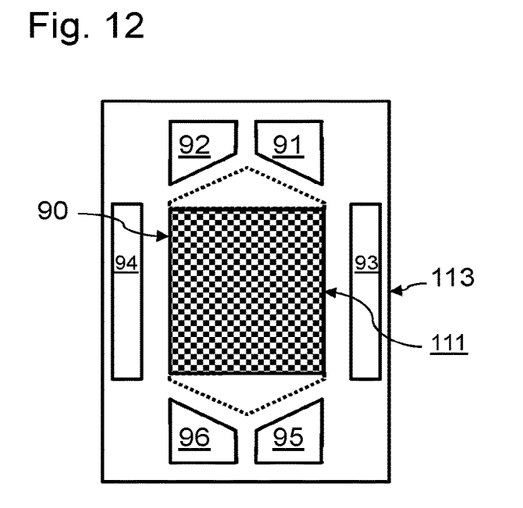

In the example in FIG. 12, the surface density of the recesses is relatively high. Here, the effective surface of the anode 111 represents 50% of the surface of the anode 141. The anode 111 extends from near the inlet holes 91 and 92 to near the exhaust ports 95 and 96.

Figure 13:
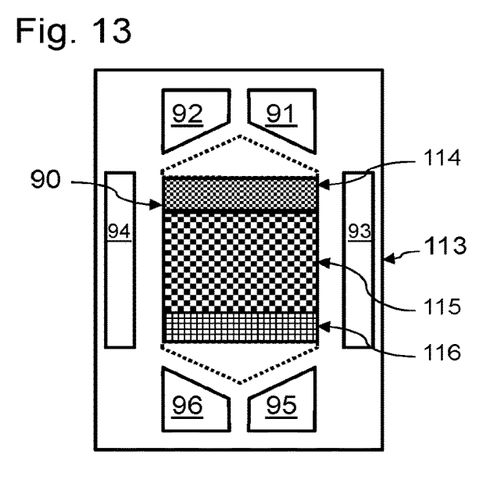

In the example in FIG. 13, several bands 114 to 116 of the anode 111 are positioned successively between the inlet holes 91 and 92 and the exhaust ports 95 and 96. The bands 114 to 116 have proportions different from recesses of zones 97. In the present case, band 114 comprises a proportion of recesses of 20% (structure identical to that in the example in FIG. 11), band 115 comprises a proportion of recesses of 50% (structure identical to that in the example in FIG. 12) and band 116 comprises a proportion of recesses of 80%. Such a configuration makes it possible for example to localize the electrochemical reaction and the release of heat in suitable locations. The different bands 114 to 116 of the anode 111 extend in the direction of the width of the reactive zone.

Figure 14:
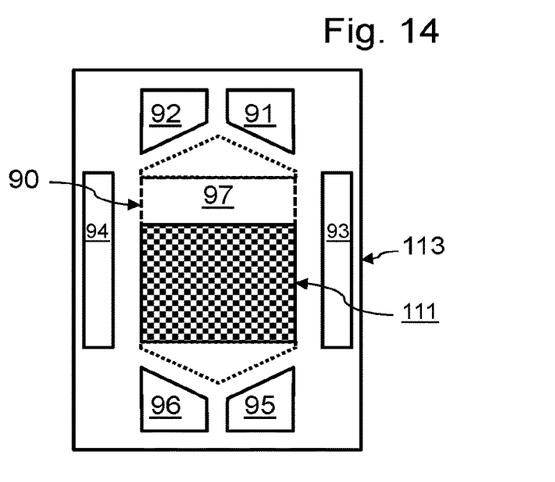

In the example in FIG. 14, the anode 111 is formed near the exhaust ports 95 and 96. The anode 111 is in the form of a rectangular band, in the direction of the width of the reactive zone. Here, anode 111 has the same structure of recesses as the example in FIG. 11. A rectangular zone 97 is also positioned near the inlet holes 91 and 92, between these inlet holes and the anode 111.

In the examples in FIGS. 3 to 14, the flow of reactant through the various flow channels 541 is along one and the same length of anode 111, so that the electrochemical reaction is roughly the same for these different flow channels 541.

We may envisage formation of the anodes 111 and 141 and/or of the cathodes 112 and 142 by a process known per se, for example screen printing or printing with an electrocatalytic ink. Such processes prove for example particularly suitable for making recesses with patterns as described with reference to FIGS. 11 to 14.

We may also envisage modulating the thickness of anode 111 relative to the thickness of anode 141, in order to differentiate their surface densities of electrocatalytic material. The concentration of electrocatalytic material may also be differentiated between an ink deposited to form anode 111 and an ink deposited to form anode 141.

Advantageously, an electrochemical cell including an anode 111 is positioned at one end of the stack. In fact, such cells are generally better cooled than the cells in the middle of the stack, owing to the natural convection at the ends of the stack. Since an electrochemical cell of this kind may have a modified operating point, with higher power density and lower energy efficiency, natural convection promotes cooling of this cell which has greater production of heat.

The invention has been described previously with bipolar plates forming anode and cathode flow channels. However, it may also be envisaged to use bipolar plates having a network of the porous type forming obstacles to the flow of the reactants.

The invention has been described previously for a fuel cell supplied with dihydrogen fuel. The invention also applies of course to fuel cells using other types of fuel, for example methanol.

The invention has been described previously for application to fuel cells. The invention also applies of course to other proton exchange membrane electrochemical reactors, for example electrolysers. In such a case, the bipolar plates 5 may be replaced with flow guides polarized at respective electrolysis voltages.

The invention has been described previously in an example in which an assembly of electrochemical cells of the first type and of the second type is included in one and the same electrochemical reactor. We may, however, also envisage using the electrochemical cells of the first type for a first series of electrochemical reactors and envisage using the electrochemical cells of the second type for a second different series of electrochemical reactors. Thus, a manufacturing unit could form these two series of reactors having very different operating performance, while benefiting from an identical design and provision with proton exchange membranes and flow guides. These two types of electrochemical reactors could benefit from similar tests for defining their operating points and their conditions of fluid flow.

Advantageously, the electrochemical cells of one and the same series of electrochemical reactors are then identical. In fact, if we superpose electrochemical cells having one and the same distribution of surface density of the electrocatalytic materials, the current densities for the reaction are identical in the stack of cells, which avoids producing electric currents in the plane of the bipolar plates, which causes electrical losses.

For an electrochemical reactor including electrochemical cells of the second type, the operating conditions of these cells may in practice be different from those of the electrochemical cells of the first type. The operation of electrochemical cells of the first type is in particular defined for obtaining flow conditions, as a function of specific operating conditions of temperature, pressure, relative humidity, stoichiometric ratio, and current density. These operating conditions make it possible to calculate the flow of reactant circulating in the cell. The cell is designed for correctly evacuating the liquid water produced by the electrochemical reaction in a fuel cell for example, and which may be present both at the anode and at the cathode. The principal criterion for evaluating the capacity for evacuation of the liquid water in the flow channels is the pressure loss in the flow. If the pressure loss in the flow channels goes below a threshold, the liquid water can no longer be evacuated by the stream of reactant.

Depending on the passage cross-section of the flow channels, the threshold of pressure loss is generally between 10 and 100 mbar.

For electrochemical cells of the second type, with identical operating conditions, the mass flow of reactant for one and the same current density is also decreased in the same proportion. Consequently, it is then possible to change an operating parameter to maintain the volume flow rate and thus the identical level of pressure loss for the electrochemical cells of the second type and the electrochemical cells of the first type. For example, if the electrochemical cells of the first type are dimensioned for a pressure of reactant of 2 bar, if the surface area of the anodes of the electrochemical cells of the second type is reduced to 60% of the surface area of the anodes of the electrochemical cells of the first type, the pressure of reactant for the electrochemical cells of the second type can be reduced to 1.2 bar, in order to decrease the mass flow in the same proportion, while maintaining the volume flow rate and the pressure loss.

The invention claimed is:

1. An assembly of electrochemical cells for an electrochemical reactor, comprising:
   a first electrochemical cell, including:
   a first membrane/electrode assembly comprising a first proton exchange membrane, a first anode and a first cathode positioned on either side of the proton exchange membrane and each including an electrocatalytic material;
   first and second flow guides positioned on either side of the first membrane/electrode assembly;
   a second electrochemical cell, including:
   a second membrane/electrode assembly comprising a second proton exchange membrane, a second anode and a second cathode positioned on either side of the proton exchange membrane and each including an electrocatalytic material;
   third and fourth flow guides positioned on either side of the second membrane/electrode assembly;
   wherein:
   the first and third flow guides have one and the same geometry;
   the second and fourth flow guides have one and the same geometry;
   the first anode and the second anode have different distributions of surface densities of electrocatalytic material on respective faces of the first and second proton exchange membranes, or the first cathode and the second cathode have different distributions of surface densities of electrocatalytic material on respective faces of the first and second proton exchange membranes, the first proton exchange membrane comprising a central portion completely covered by the first anode and by the first cathode, the second proton exchange membrane comprising a central portion having a zone not covered by the second anode and by the second cathode.

2. The assembly of electrochemical cells according to claim 1, wherein the first anode and the second anode include one and the same electrocatalytic material, and wherein the first cathode and the second cathode include one and the same electrocatalytic material.

3. The assembly of electrochemical cells according to claim 1, wherein the second anode and the second cathode have an identical shape in projection according to a normal to the second proton exchange membrane.

4. The assembly of electrochemical cells according to claim 1, wherein at least part of said zone that is not covered is defined by multiple recesses of the second anode and second cathode, said recesses being distributed uniformly in the second anode and in the second cathode.

5. The assembly of electrochemical cells according to claim 4, wherein said recesses have one and the same geometry.

6. The assembly of electrochemical cells according to claim 1, wherein said zone that is not covered is defined by at least one recess of the second anode and one recess of the second cathode extending over the full width of the latter.

7. The assembly of electrochemical cells according to claim 1, wherein the second anode covers a surface area of the second proton exchange membrane between 10 and 80% of the area of overlap of the first proton exchange membrane by the first anode.

8. The assembly of electrochemical cells according to claim 1, wherein said second anode is formed in a single piece, and wherein said second cathode is formed in a single piece.

9. The assembly of electrochemical cells according to claim 1, wherein said second anode is formed of several separate elements, and wherein said second cathode is formed of several separate elements.

10. The assembly of electrochemical cells according to claim 8, wherein:
    the first and third flow guides comprise flow channels, flow through these different flow channels running along one and the same length of the anode;
    or the second and fourth flow guides comprise flow channels, flow through these different flow channels running along one and the same length of the cathode.

11. The assembly of electrochemical cells according to claim 1, wherein the second anode has at least one part extending over the same width as the first anode.

12. An electrochemical reactor, comprising a stack of electrochemical cells, said stack including an assembly of electrochemical cells according to claim 1.

13. A fuel cell, comprising a stack of electrochemical cells, said stack including an assembly of electrochemical cells according to claim 1.

* * * * *

UNITED STATES PATENT AND TRADEMARK OFFICE
CERTIFICATE OF CORRECTION

PATENT NO. : 10,862,150 B2
APPLICATION NO. : 16/243275
DATED : December 8, 2020
INVENTOR(S) : Jean-Philippe Poirot-Crouvezier Page 1 of 1

It is certified that error appears in the above-identified patent and that said Letters Patent is hereby corrected as shown below:

On the Title Page

On Page 2, Column 1, Item (51), under "Int. Cl.", Lines 6-9,
      *H01M 8/1018*   (2016.01)
      *C25B 15/08*   (2006.01)
      *C25B 9/08*   (2006.01)
delete "*C25B 1/10*   (2006.01)" and insert --*H01M 8/1018*   (2016.01)--, In the Claims In Column 9, Claim 1, Line 65, delete "geometry;" and insert --geometry; and--.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*